(12) United States Patent
Arimoto

(10) Patent No.: US 8,034,221 B2
(45) Date of Patent: Oct. 11, 2011

(54) ELECTRODE FOR HYDROGEN GENERATION AND PROCESS FOR PREPARATION THEREOF

(75) Inventor: Osamu Arimoto, Tamano (JP)

(73) Assignee: Chlorine Engineers Corp., Ltd., Tokyo (JP)

( * ) Notice: Subject to any disclaimer, the term of this patent is extended or adjusted under 35 U.S.C. 154(b) by 0 days.

(21) Appl. No.: 12/718,220

(22) Filed: Mar. 5, 2010

(65) Prior Publication Data

US 2010/0155235 A1    Jun. 24, 2010

Related U.S. Application Data

(62) Division of application No. 11/877,954, filed on Oct. 24, 2007, now Pat. No. 7,704,909.

(30) Foreign Application Priority Data

Oct. 25, 2006 (JP) .................................. 2006-289713
Oct. 18, 2007 (JP) .................................. 2007-270852

(51) Int. Cl.
*C25B 11/06* (2006.01)
*C25B 11/08* (2006.01)

(52) U.S. Cl. ................ 204/290.1; 204/290.14; 204/291; 204/292; 502/101; 427/229

(58) Field of Classification Search .................. 204/291, 204/292, 290.04, 290.08, 290.1, 290.14, 204/283; 427/115, 125, 126.1, 229, 383.3; 502/101

See application file for complete search history.

(56) References Cited

U.S. PATENT DOCUMENTS

| | | | | |
|---|---|---|---|---|
| 7,122,219 | B2 * | 10/2006 | Houda et al. | 427/115 |
| 7,229,536 | B2 * | 6/2007 | Houda et al. | 204/291 |
| 2006/0231387 | A1 | 10/2006 | Houda et al. | |

FOREIGN PATENT DOCUMENTS

| | | |
|---|---|---|
| JP | 2000-239882 A | 9/2000 |
| JP | 2003-277966 A | 10/2003 |
| WO | 03-078694 A1 | 9/2003 |

OTHER PUBLICATIONS

European Search Report dated Sep. 11, 2008 issued in corresponding European patent Application No. 07119059.9.
Japanese Office Action dated Sep. 19, 2008 issued in corresponding Japanese patent Application No. 2007-270852.

* cited by examiner

*Primary Examiner* — Bruce Bell
(74) *Attorney, Agent, or Firm* — Westerman, Hattori, Daniels & Adrian, LLP

(57) ABSTRACT

An electrode for hydrogen generation can maintain a low hydrogen overvoltage for a long period of time even when electrolysis is conducted there not only with a low current density but also with a high current density. The electrode for hydrogen generation has a coating layer formed on a conductive base member by applying a material not containing any chlorine atom prepared by dissolving lanthanum carboxylate in a nitric acid solution of ruthenium nitrate and thermally decomposing the material in an oxygen-containing atmosphere.

6 Claims, 4 Drawing Sheets

ELECTRODE FOR HYDROGEN GENERATION AND PROCESS FOR PREPARATION THEREOF

CROSS-REFERENCE TO RELATED APPLICATIONS

The present application is a divisional application of Ser. No. 11/877,954, filed Oct. 24, 2007, now U.S. Pat. No. 7,704,909, which is based upon and claims the benefit of priority from Japanese Patent Applications No. 2006-289713, filed Oct. 25, 2006 and No. 2007-270852, filed Oct. 18, 2007, the entire contents of which are incorporated herein by reference.

BACKGROUND

1. Field of the Invention

This invention relates to an electrode for hydrogen generation having a low hydrogen overvoltage to be used for electrolysis of aqueous solutions typically including brine.

2. Description of the Related Art

It is a very important challenge to reduce the energy consumption rate of electrolysis of brine. While the energy consumption rate of ion-exchange membrane electrolysis is relatively low if compared with other electrolytic processes, there is a demand for techniques that can further reduce the energy consumption rate of ion-exchange membrane electrolysis.

The power consumption rate of ion-exchange membrane electrolysis depends on various factors such as the structure of the electrolyzer including an anode, an ion-exchange membrane and a cathode. The particular object of the present invention is to reduce the energy consumption rate of electrolysis by reducing the hydrogen overvoltage at the electrode for hydrogen generation that operates as cathode.

Many proposals have already been made for electrodes for hydrogen generation to be used for electrolysis of aqueous solutions including brine. Such proposals include those for using an electrode having an electrode catalyst coating of nickel, cobalt, a platinum group metal or an oxide or an alloy of any of such metals formed on a metal base member.

Electrodes for hydrogen generation are required to show a low hydrogen overvoltage and additionally not to contaminate the ion-exchange membrane with the heavy metal eluted from the electrode catalyst coating formed on the surface of the electrode even when the electrode is operated in a state where an ion-exchange membrane and the electrode for hydrogen generation are held in contact with each other. Still additionally, the ion-exchange membrane is required to be undamaged when it is brought into contact with the surface of the electrode catalyst layer.

WO 2003/078694 proposes to form a coating layer of an electrode catalyst by applying a mixture of ruthenium chloride, cerium chloride and oxalic acid to the surface of a conductive base member and thermally decomposing it.

When forming an electrode catalyst layer by thermally decomposition, it is a common practice to use a substance whose metal component shows a high solubility and that is decomposed by thermally decomposition and volatilized so as not to remain in the electrode catalyst layer for the solution containing the metal compound that is to be applied onto the conductive base member. In the case of using a platinum group metal compound, it is a common practice to utilize a hydrochloric acid solution of chloride of the metal. However, no attention has been paid to date to the type of the salt of the metal compound.

For example, according to the above-cited WO 2003/078694, ruthenium chloride and cerium oxalate are introduced into the electrode catalyst coating layer of the electrode for hydrogen generation respectively as ruthenium and cerium. However, the fall of the electric potential is not satisfactory for electrolysis with a high electric current density.

Thus, it is the object of the present invention to provide an electrode for hydrogen generation that can maintain a low hydrogen overvoltage for a long period of time in electrolysis using a high current density and is highly catalysis-active relative to hydrogen generation reactions, while it can satisfactorily prevent the ion-exchange membrane from being contaminated by the eluted heavy metal even when the ion-exchange membrane is brought into contact with the cathode in the electrolyzer and excellently shows a uniform current distribution on the electrode surface.

SUMMARY

According to the present invention, the above object is achieved by providing an electrode for hydrogen generation having a coating layer formed by thermally decomposing in an oxygen-containing atmosphere a material not containing any chlorine atom prepared by dissolving lanthanum carboxylate in a nitric acid solution of ruthenium nitrate and applied onto a conductive base member.

Preferably, in an electrode for hydrogen generation as defined above, the Ru/La atom ratio of the material of the applied solution is between 30/70 and 90/10.

Preferably, in an electrode for hydrogen generation as defined above, the carboxylate is at least one selected from a group including lanthanum acetate, lanthanum formate and lanthanum oxalate.

Preferably, in an electrode for hydrogen generation as defined above, the applied material contains at least a platinum compound not containing any chlorine atom and the Pt/La atom ratio therein is 0.005 or greater than 0.005.

Preferably, in an electrode for hydrogen generation as defined above, the platinum compound is at least either dinitrodiammine platinum or hexahydroxo platinate.

In another aspect of the present invention, there is provided an electrode for hydrogen generation having a coating layer containing atoms of ruthenium, lanthanum, oxygen and carbon, formed by thermally decomposing in an oxygen-containing atmosphere a material prepared by dissolving lanthanum carboxylate in a nitric acid solution of ruthenium nitrate and applied onto a conductive base member.

In still another aspect of the present invention, there is provided a process for preparing an electrode for hydrogen generation including: applying a material not containing airy chlorine atom prepared by dissolving lanthanum carboxylate in a nitric acid solution of ruthenium nitrate onto a conductive base member; and thermally decomposing the material at temperature from 400° C. to 600° C. in an oxygen containing atmosphere to form a coating layer on the conductive base member.

Preferably, in a process for preparing an electrode for hydrogen generation as defined above, the Ru/La atom ratio of the material of the applied solution is between 30/70 and 90/10.

Preferably, in a process for preparing an electrode for hydrogen generation as defined above, the carboxylate is at least one selected from a group including lanthanum acetate, lanthanum formate and lanthanum oxalate.

Preferably, in a process for preparing an electrode for hydrogen generation as defined above, the applied material contains at least a platinum compound not containing any chlorine atom and the Pt/La atom ratio therein is 0.005 or greater than 0.005.

Preferably, in a process for preparing an electrode for hydrogen generation as defined above, the platinum compound is at least either dinitrodiammine platinum or hexahydroxo platinate.

Thus, since an electrode for hydrogen generation according to the present invention comprises a coating layer formed by heat-treating an applied material not containing any chlorine atom prepared by dissolving lanthanum carboxylate in a nitric acid solution of ruthenium nitrate at temperature within a range from 400° C. to 600° C. in an oxygen containing atmosphere, it is highly catalysis-active relative to hydrogen generation reactions and can maintain a low hydrogen overvoltage for a long period of time even when not only a low current density but also a high current density is used for electrolysis, while it excellently shows a uniform current distribution on the electrode surface and can satisfactorily prevent the ion-exchange membrane from being contaminated by the eluted heavy metal even when the ion-exchange membrane is brought into contact with the cathode. Additionally, an electrode for hydrogen generation according to the present invention can prevent the electrode catalyst coating layer from being degraded by oxygen and other substances even when it is exposed to the atmosphere.

BRIEF DESCRIPTION OF THE DRAWINGS

The invention will be described with reference to the accompanying drawings, wherein like members reference like elements.

DESCRIPTION OF EXEMPLARY EMBODIMENTS

Figure 1:
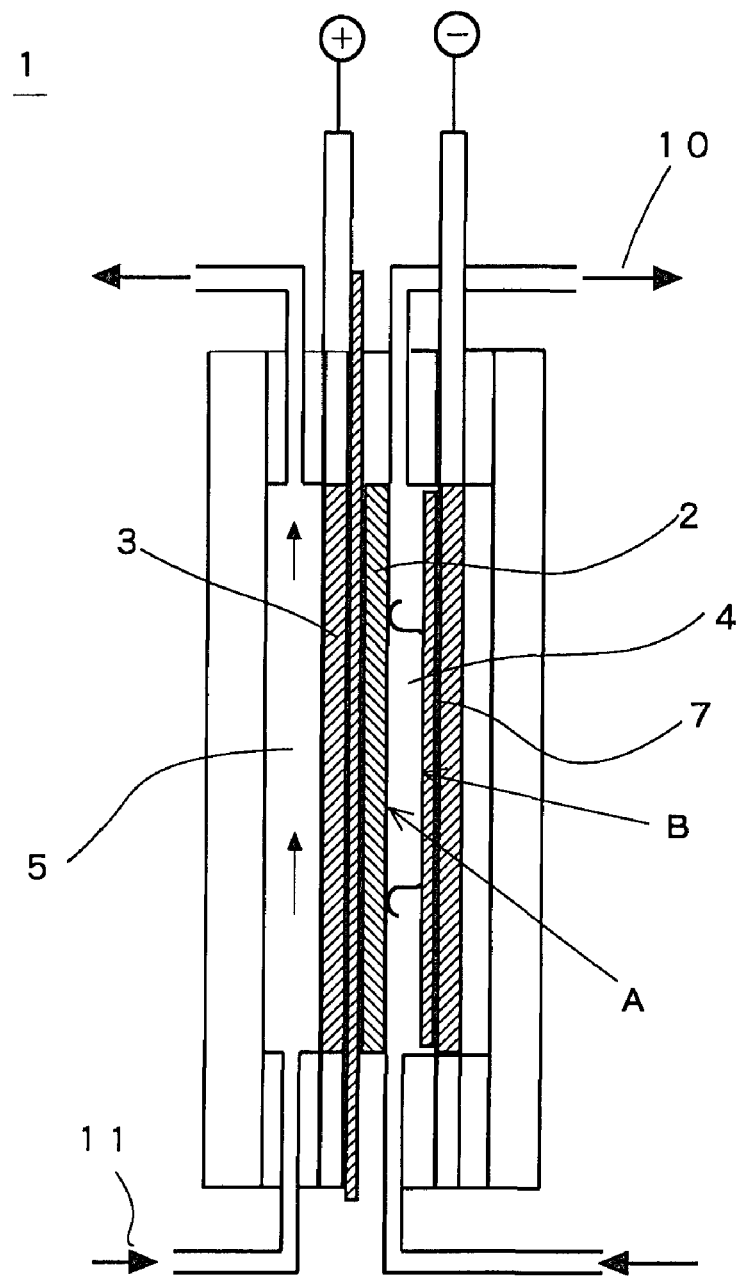
FIG. 1 is a schematic cross-sectional view of a test electrolyzer used for evaluating the present invention.

The present invention is based on a finding that an electrode catalyst coating layer formed by applying a material containing a metal compound onto a conductive base member and subsequently thermally decomposing the material in an oxygen-containing atmosphere shows electrode catalyst characteristics that are influenced to a great extent by the components of the metal compound forming the electrode catalyst other than the metal.

Thus, according to the present invention, a coating layer of an electrode catalyst is produced by applying a material not containing any chlorine compound prepared by dissolving an organic salt of lanthanum in a nitric acid solution of ruthenium nitrate onto a conductive base member and subsequently heat-treating the material at temperature in a range from 400° C. to 600° C. in an oxygen containing atmosphere.

Thus, according to the present invention, not ruthenium chloride that is popular as a starting material for manufacturing catalysts but a nitric acid solution of ruthenium nitrate is employed. Conventionally, when forming an electrode catalyst by heating ruthenium oxide in an oxygen-containing atmosphere, it is believed that either ruthenium chloride or ruthenium nitrate may be used without discrimination because ruthenium oxide is produced by either of them.

However, the inventor of the present invention has made it clear that the electrochemical characteristics of an electrode for hydrogen generation show remarkable differences between when the electrode catalyst coating layer is prepared by using ruthenium chloride as starting material and when it is prepared by using ruthenium nitrate as starting material. This fact has not been anticipated by anybody.

According to the present invention, preferably one or more than one lanthanum carboxylases selected from a group of lanthanum acetate, lanthanum formate and lanthanum oxalate are used with the ruthenium-containing component. The use of lanthanum acetate is more preferable because it shows a high solubility.

It may be safe to assume that the lanthanum carboxylate exists as oxycarbonate or carbonate in the thermally decomposition step of forming the coating layer of an electrode catalyst at 400° C. to 600° C. in an oxygen-containing atmosphere.

Thus, consequently, it has been confirmed that carbon atoms are found uniformly in the produced coating layer of the electrode catalyst. Therefore, it may be safe to assume that a compound that contains carbon atoms is produced in the coating layer of the electrode catalyst as a result of the thermally decomposition of lanthanum carboxylate to take an important role in the electrode catalyst coating layer that defines characteristics of the electrode for hydrogen generation.

For the purpose of the present invention, as for the ruthenium component and the lanthanum component, the Ru/La atom ratio is preferably between 30/70 and 90/10. The catalytic activity of the electrode catalyst coating layer falls to raise the hydrogen overvoltage when the ruthenium content falls below the level of the Ru/La atom ratio of 30/70 and hence such a low ruthenium content is not preferable. The mechanical strength of the catalyst coating layer falls to raise the wearing rate of the catalyst coating layer when the lanthanum content falls below the level of the Ru/La atom ratio of 90/10 and hence such a low lanthanum content is not preferable. More preferably, the Ru/La atom ratio is between 40/60 and 60/40.

The characteristics of an electrode for hydrogen generation according to the present invention are not changed when the operation of the electrolyzer is stopped and the electrode is taken out from the electrolyzer and exposed to the atmosphere before it is mounted back in the electrolyzer to resume the operation of the electrolyzer. This fact indicates that the characteristics of an electrode catalyst coating layer formed from ruthenium nitrate and ruthenium carboxylate according to the present invention are not changed in the atmosphere and the conductive base member of the electrode is densely coated by the electrode catalyst coating layer.

Additionally, since the conductive base member of the electrode is covered by a dense electrode catalyst coating, the electrode catalyst coating layer is not degraded by the eluted metal component of the conductive base member. Then, as a result, the ion-exchange membrane is not adversely affected by elution of the metal component and hence the electrolyzer employing such an ion-exchange membrane can stably operate for a long period of time without requiring any measure for preventing such an adverse effect.

Materials that can be used for the conductive base member of an electrode for hydrogen generation according to the present invention include expanded metals, porous plates and plain weave wire mesh. Metals that can be used for the conductive base member of an electrode for hydrogen generation according to the present invention include nickel and stainless steel, although the use of nickel is preferable because nickel is free from any risk of elution of iron and chromium in the course of operation. The thickness of the conductive base member is typically between 0.1 and 2 µm.

When an electrode catalyst coating layer is formed by using a plain weave wire mesh formed by weaving metal wires as conductive base member, there can take place a phenomenon of a high electrolyzer voltage that is higher than an expected voltage level in the initial stages of energizing the electrolyzer. This phenomenon is not observable in electrodes formed by a single metal member such as an expended metal. Therefore, it may be safe to assume that this phenomenon is produced as the intertwined parts of the metal wires of the plain weave wire mesh become undulated when the electrode catalyst coating layer is produced so as to give rise to a large contact resistance in the initial stages of energizing the electrolyzer.

While it is possible to reduce the undulations of the electrode catalyst coating layer can be relatively reduced by reducing the thickness of the electrode catalyst coating layer, there arises a problem that the catalytic activity falls for the hydrogen generation reaction because the quantity of catalyst of the electrode catalyst coating layer is reduced.

For the purpose of the present invention, the thickness of the electrode catalyst coating layer is within a range between 3 and 6 µm. Then, it is possible to provide a sufficient level of catalytic activity if the thickness is relatively small and not greater than 5 µm.

A platinum compound that does not contain any chlorine atom may be added to the material to be applied to the conductive base member in addition to a ruthenium compound and lanthanum carboxylate to form an electrode catalyst coating layer that contains platinum.

When platinum is added to the electrode catalyst coating layer in addition to ruthenium and lanthanum, it is possible to achieve an effect that the performance of the electrode catalyst coating layer is prevented from degrading after energization and the electrode catalyst coating layer is prevented from wearing although the reason for this is not clear yet.

When a platinum compound that does not contain any chlorine atom is compounded, the Pt/La atom ratio in the material to be applied to form an electrode catalyst coating layer is preferably not less than 0.005. The effect of compounding a platinum compound is not observable when the atom ratio is less than 0.005.

At least either dinitrodiammine platinum or hexahydroxo platinate can be employed as a platinum compound containing no chlorine atom that can be used for the purpose of the present invention. Since the wear of the electrode catalyst coating layer is suppressed more effectively when platinum exists in it, it is possible to maintain the catalytic activity of the electrode catalyst coating layer relative to the hydrogen generation reaction for a long period of time if the thickness of the electrode catalyst coating layer is not more than 5 µm.

To form an electrode catalyst coating layer according to the present invention, the heat-treatment process is conducted in an oxygen-containing atmosphere preferably at temperature from 400° C. to 600° C., more preferably at temperature from 460° C. to 540° C. It is difficult to form an electrode catalyst coating layer that is excellent in electrode catalyst activeness relative to hydrogen generation reaction when the temperature is lower than 400° C., whereas the conductive base member becomes liable to be oxidized when the temperature exceeds 600° C. The oxygen-containing atmosphere may typically be air or an atmosphere containing oxygen by 40 to 100 vol %.

Now, the present invention will be described further by way of examples and comparative examples.

Example 1

Three expanded metal sheets made of nickel and cut to dimensions of a length of 20 mm and a width of 20 mm: a major axis of 8 mm, a minor axis of 3.7 mm and a thickness of 0.8 mm, were immersed in a degreasing solution (containing degreasing agent PAKUNA 78, trade name, available from YUKEN Industry CO., LTD. by 50 g/L) at 50° C. for 30 minutes to remove the surface grease and then washed with water. Subsequently, the metal sheets were immersed in boiling hydrochloric acid (concentrated hydrochloric acid:water=1:1 volume portion) for five minutes and then thoroughly washed with water and dried.

A ruthenium nitrate-lanthanum acetate nitric acid solution was prepared by using a ruthenium nitrate nitric acid solution (available from Tanaka Kikinzoku Kogyo K. K.) and lanthanum acetate n-hydrate (available from Wako Pure Chemical Industries, Ltd.). The concentration of ruthenium nitrate in the obtained ruthenium nitrate-lanthanum acetate nitric acid solution was 1.0 mol/L and the concentration of lanthanum acetate was 0.5 mol/L. Thus, the Ru/La atom ratio of the ruthenium nitrate-lanthanum acetate nitric acid solution was 50/50.

Subsequently, the prepared ruthenium nitrate-lanthanum acetate nitric acid solution was applied to the surface-treated expanded metal sheets made of nickel, which were then dried in a drier at 70° C. for 10 minutes. Then, the expanded metal sheets were heat-treated and thermally decomposed in a muffle furnace at 500° C. in an air atmosphere for 15 minutes. The application and thermally decomposing operation was conducted for five cycles to obtain electrodes for hydrogen generation as specimens.

1. Evaluation of Cathode Potential

An electrolysis process was conducted in an aqueous solution of sodium hydroxide with a concentration of 30 mass % at temperature of 90° C. for 2 hours, employing each of the obtained specimens of the electrodes for hydrogen generation and an expanded metal sheet made of nickel same as the one used for the base member of the electrode for hydrogen generation respectively as cathode and anode and a current pulse generator (Type HC-113, trade name, available from Hokuto Denko Corporation) as power source for a current density of 8 kA/m2. Thereafter, the cathode potential was observed by a current interrupter method using an electrometer (Type HE-104, trade name, available from Hokuto Denko Corporation) and a transient converter (Type TCC-DG, trade name, available from Riken Denshi Co., Ltd.) with use of mercury/mercury oxide electrode with the internal solution containing 30 mass % NaOH aqueous solution as reference electrode. Table 1 below summarily shows the obtained results.

2. Evaluation of Wearing Rate

An electrolytic hydrogen generation reaction process was conducted in an aqueous solution of sodium hydroxide with a concentration of 30 mass % and a current density of 20 kA/m2 at temperature of 90° C. for 72 hours or 144 hours, employing each of the obtained specimens of the electrodes for hydrogen generation and an expanded metal sheet made of nickel same as the one used for the base member of the electrode for hydrogen generation respectively as cathode and anode.

After the end of the electrolytic process, the electrode for hydrogen generation was taken out, washed with water and then dried in a drier at 60° C. for 0.5 hours. Then, the mass of the electrode was observed to compare the mass before the electrolysis and the mass after the electrolysis and the remaining ratio of the electrode catalyst coating layer was determined. Table 3 below shows the obtained results expressed in percentage.

Example 2

Three specimens of electrode for hydrogen generation were prepared as in Example 1 except that the lanthanum acetate n-hydrate of Example 1 was replaced by lanthanum oxalate (available from Wako Pure Chemical Industries, Ltd.) and a ruthenium nitrate-lanthanum oxalate nitric acid solution was prepared with a Ru/La atom ratio of 50/50.

The obtained specimens of electrode thr hydrogen generation were evaluated for the cathode potential as in Example 1. Table 1 summarily shows the obtained results.

Example 3

Three specimens of electrode for hydrogen generation were prepared as in Example 1 except that the lanthanum acetate n-hydrate of Example 1 was replaced by lanthanum formate and a ruthenium nitrate-lanthanum formate nitric acid solution was prepared with a Ru/La atom ratio of 50/50.

The obtained specimens of electrode for hydrogen generation were evaluated for the cathode potential as in Example 1. Table 1 summarily shows the obtained results.

Comparative Example 1

Three specimens of electrode for hydrogen generation were prepared as in Example 1 except that the lanthanum acetate of Example 1 was replaced by lanthanum nitrate and a ruthenium nitrate-lanthanum nitrate nitric acid solution was prepared with a Ru/La atom ratio of 50/50.

The obtained specimens of electrode for hydrogen generation were evaluated for the cathode potential as in Example 1. Table 1 summarily shows the obtained results. The specimens were also evaluated for the wearing rate as in Example 1. Table 3 shows the obtained results.

Comparative Example 2

Three specimens of electrode for hydrogen generation were prepared as in Example 1 except that the ruthenium nitrate of Example 1 was replaced by ruthenium chloride and a ruthenium chloride-lanthanum acetate nitric acid solution was prepared with a Ru/La atom ratio of 50/50.

The obtained specimens of electrode for hydrogen generation were evaluated for the cathode potential as in Example 1. Table 1 summarily shows the obtained results.

Comparative Example 3

Three specimens of electrode for hydrogen generation were prepared as in Example 1 except that the ruthenium nitrate and the lanthanum acetate of Example 1 were replaced respectively by ruthenium chloride and lanthanum nitrate and a ruthenium chloride-lanthanum nitrate nitric acid solution was prepared with a Ru/La atom ratio of 50/50.

The obtained specimens of electrode for hydrogen generation were evaluated for the cathode potential as in Example 1. Table 1 summarily shows the obtained results.

TABLE 1

| | applied material | | | Ru content | Coating | cathode potential (V) | |
|---|---|---|---|---|---|---|---|
| | ruthenium compound | lanthanum compound | Specimen No. | in coating ($g/m^2$) | thickness ($\mu m$) | measured value | average value |
| Example 1 | ruthenium nitrate | lanthanum acetate | 1 | 4.3 | 4.5 | −1.007 | −1.007 |
| | | | 2 | 4.5 | 5.0 | −1.005 | |
| | | | 3 | 4.5 | 4.9 | −1.008 | |
| Example 2 | ruthenium nitrate | lanthanum oxalate | 1 | 4.1 | 4.2 | −1.009 | −1.007 |
| | | | 2 | 4.4 | 4.4 | −1.007 | |
| | | | 3 | 4.4 | 4.5 | −1.004 | |
| Example 3 | ruthenium nitrate | lanthanum acetate | 1 | 4.2 | 4.1 | −1.005 | −1.005 |
| | | | 2 | 4.4 | 4.7 | −1.003 | |
| | | | 3 | 4.2 | 4.7 | −1.008 | |
| Comp. Example 1 | ruthenium nitrate | lanthanum nitrate | 1 | 4.6 | 5.2 | −1.014 | −1.012 |
| | | | 2 | 4.5 | 5.3 | −1.011 | |
| | | | 3 | 4.7 | 4.9 | −1.011 | |
| Comp. Example 2 | ruthenium chloride | lanthanum acetate | 1 | 4.2 | 4.8 | −1.021 | −1.018 |
| | | | 2 | 4.7 | 5.0 | −1.015 | |
| | | | 3 | 4.4 | 4.6 | −1.017 | |
| Comp. Example 3 | ruthenium chloride | lanthanum nitrate | 1 | 4.4 | 4.4 | −1.025 | −1.024 |
| | | | 2 | 4.7 | 4.5 | −1.022 | |
| | | | 3 | 4.6 | 4.2 | −1.024 | |

Example 4

A specimen of electrode for hydrogen generation was prepared as in Example 1 except that dinitrodiammine platinum was added to the ruthenium nitrate-lanthanum acetate nitric acid solution to be applied and hence a ruthenium nitrate-lanthanum acetate-dinitrodiammine platinum nitric acid solution was used with a Ru/La/Pt atom ratio of 50/50/1.5. The obtained specimen of electrode for hydrogen generation was evaluated as in Example 1. Table 2 summarily shows the obtained result.

The specimen was also evaluated for the wearing rate as in Example 1. Table 3 shows the obtained result.

Example 5

A specimen of electrode for hydrogen generation was prepared as in Example 4 except that compounding ratio of dinitrodiammine platinum in the ruthenium nitrate-lanthanum acetate-dinitrodiammine platinum nitric acid solution was changed to produce a Ru/La/Pt atom ratio of 50/50/2.5. The obtained specimen of electrode for hydrogen generation was evaluated as in Example 1. Table 2 summarily shows the obtained result.

The specimen was also evaluated for the wearing rate. Table 3 shows the obtained result.

Example 6

A specimen of electrode for hydrogen generation was prepared as in Example 4 except that compounding ratio of dinitrodiammine platinum in the ruthenium nitrate-lanthanum acetate-dinitrodiammine platinum nitric acid solution was changed to produce a Ru/La/Pt atom ratio of 50/50/5. The obtained specimen of electrode for hydrogen generation was evaluated as in Example 1. Table 2 summarily shows the obtained result.

The specimen was also evaluated for the wearing rate. Table 3 shows the obtained result.

Example 7

A specimen of electrode for hydrogen generation was prepared as in Example 4 except that compounding ratio of dinitrodiammine platinum in the ruthenium nitrate-lanthanum acetate-dinitrodiammine platinum nitric acid solution was changed to produce a Ru/La/Pt atom ratio of 50/50/10. The obtained specimen of electrode for hydrogen generation was evaluated as in Example 1. Table 2 summarily shows the obtained result.

The specimen was also evaluated for the wearing rate as in Example 1, Table 3 shows the obtained result.

Example 8

A specimen of electrode for hydrogen generation was prepared as in Example 4 except that compounding ratio of dinitrodiammine platinum in the ruthenium nitrate-lanthanum acetate-dinitrodiammine platinum nitric acid solution was changed to produce a Ru/La/Pt atom ratio of 50/50/20. The obtained specimen of electrode for hydrogen generation was evaluated as in Example 1. Table 2 summarily shows the obtained result.

The specimen was also evaluated for the wearing rate as in Example 1. Table 3 shows the obtained result.

Example 9

A specimen of electrode for hydrogen generation was prepared as in Example 4 except that the dinitrodiammine platinum in the dinitrodiammine platinum nitric acid solution was replaced by hexahydroxo platinate and hence a ruthenium nitrate-lanthanum acetate-hexahydroxo platinate nitric acid solution was used with a Ru/La/Pt atom ratio of 50/50/1.5. The obtained specimen of electrode for hydrogen generation was evaluated as in Example 1. Table 2 summarily shows the obtained result.

The specimen was also evaluated for the wearing rate as in Example 1. Table 3 shows the obtained result.

Example 10

A specimen of electrode for hydrogen generation was prepared as in Example 4 except that compounding ratio of hexahydroxo platinate in the ruthenium nitrate-lanthanum acetate-hexahydroxo platinate nitric acid solution was changed to produce a Ru/La/Pt atom ratio of 50/50/1. The obtained specimen of electrode for hydrogen generation was evaluated as in Example 1. Table 2 summarily shows the obtained result.

The specimen was also evaluated for the wearing rate as in Example 1. Table 3 shows the obtained result.

TABLE 2

| | applied material | | | | | | | |
|---|---|---|---|---|---|---|---|---|
| | ruthenium nitrate (mol/L) | lanthanum acetate (mol/L) | dinitro-diammine platinum (mol/L) | hexa-hydroxo platinate (mol/L) | Pt/Ru atom ratio | Ru content in coating (g/m$^2$) | coating thickness (μm) | cathode potential (V) |
| Example 4 | 0.5 | 0.5 | 0.015 | — | 0.03 | 4.7 | 5.1 | −1.006 |
| Example 5 | 0.5 | 0.5 | 0.025 | — | 0.05 | 4.5 | 4.7 | −1.006 |
| Example 6 | 0.5 | 0.5 | 0.05 | — | 0.1 | 4.5 | 4.8 | −1.002 |
| Example 7 | 0.5 | 0.5 | 0.1 | — | 0.2 | 4.5 | 4.5 | −0.999 |
| Example 8 | 0.5 | 0.5 | 0.2 | — | 0.4 | 3.9 | 4.1 | −0.993 |
| Example 9 | 0.5 | 0.5 | — | 0.015 | 0.03 | 4.6 | 4.4 | −1.010 |
| Example 10 | 0.5 | 0.5 | — | 0.01 | 0.2 | 4.5 | 4.3 | −1.004 |

TABLE 3

| | Pt/Ru atom ratio of applied material | mass of electrode catalyst coating layer (g) | | | remaining ratio (%) | |
|---|---|---|---|---|---|---|
| | | before energization | after 72 hours | after 144 hours | after 72 hours | after 144 hours |
| Comp Ex. 1 | 0 | 14.01 | 13.72 | 13.35 | 97.93 | 95.29 |
| Example 1 | 0 | 13.52 | 13.22 | 12.98 | 97.78 | 96.01 |
| Example 4 | 0.03 | 14.01 | 14.01 | 14.00 | 100.00 | 99.93 |
| Example 5 | 0.05 | 13.51 | 13.50 | 13.50 | 99.93 | 99.93 |
| Example 6 | 0.1 | 14.11 | 14.11 | 14.10 | 100.00 | 99.93 |
| Example 7 | 0.2 | 15.07 | 15.07 | 15.05 | 100.00 | 99.87 |
| Example 8 | 0.4 | 14.24 | 14.24 | 14.22 | 99.93 | 99.79 |

TABLE 3-continued

| | Pt/Ru atom ratio of applied material | mass of electrode catalyst coating layer (g) | | | remaining ratio (%) | |
|---|---|---|---|---|---|---|
| | | before energization | after 72 hours | after 144 hours | after 72 hours | after 144 hours |
| Example 9 | 0.03 | 13.98 | 13.98 | 13.98 | 99.93 | 99.93 |
| Example 10 | 0.2 | 14.05 | 14.05 | 14.04 | 100.00 | 99.93 |

Example 11

A specimen of electrode for hydrogen generation was prepared as in Example 5 except that the operation of applying and thermally decomposing the ruthenium nitrate-lanthanum acetate-dinitrodiammine platinum nitric acid solution was conducted for three cycles. The film thickness of the electrode catalyst coating layer of the obtained electrode was 3.5 μm. The voltage drop characteristics between the obtained electrode for hydrogen generation and the feed member were evaluated in a manner as described below.

3. Evaluation of Voltage Drop Characteristics

Each of the specimens of the prepared electrode for hydrogen generations was operated as cathode 2, while a chlorine generation electrode (DSE JP-202, trade name, available from PERMELEC ELECTRODE LTD.) using a titanium-made expanded metal as base member was mounted as anode 3 in a test electrolyzer 1 as shown in FIG. 1, which is a cross-sectional view thereof. The cathode chamber 4 and the anode chamber 5 were partitioned by a cation-exchange membrane (FLEMION F8020, trade name, available from Asahi Glass Co., Ltd.) and the components were put together by way of a gasket (not shown).

An electrolysis process was conducted with a current density of 4 kA/m2 at temperature of 88 to 90° C., continuously supplying water into the cathode chamber 4 so as to make the concentration of the aqueous solution of sodium hydroxide 10 that is being discharged from it equal to 32 mass % and also supplying brine 11 of 300 g/L to the anode chamber 5.

Figure 2:
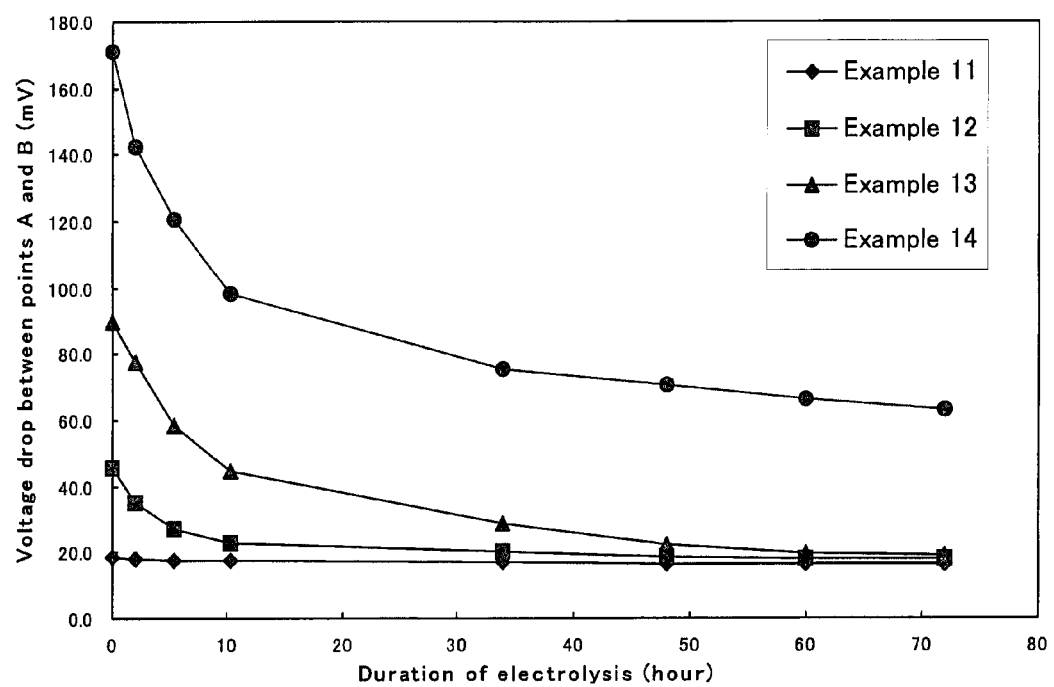
FIG. 2 is a graph schematically illustrating the change, or the fall, with time of the voltage of the electrodes for hydrogen generation of the examples, which will be described hereinafter.

In the test electrolyzer 1, the electric current was supplied to the cathode 2 as the cathode 2 is held in contact with a spring-like nickel-made feed plate 7. The voltage drop between point A located at the rear surface of the cathode 2 and point B located on the nickel-make feed plate 7 was observed continuously. Table 4 shows the time elapsed since the current density got to 4 kA/m2 along with the results of evaluation. FIG. 2 also shows the results of observation.

In Table 4, EXP represents the expanded metal that was used as conductive base member and plain weave refers to a plain weave wire mesh.

4. Evaluation of Characteristics after Exposure to Atmosphere

After a continuous operation for 2 weeks in the test electrolyzer where the voltage drop characteristics were observed, each of the specimens was observed for the voltage drop, the inter-electrode voltage, the hydrogen overvoltage, the average corrected inter-electrode voltage and the sodium hydroxide generation reference current efficiency. Table 5 shows the results of observation under the heading of "immediately before the step of initial operation of electrolyzer".

After the observation, the operation of the electrolyzer was stopped and the electrolyzer was dismantled. After each of the components was washed and dried, the electrode for hydrogen generation was exposed to the indoor for two weeks. Then, the electrolyzer was assembled again, replacing only the cation-exchange membrane with a new one, and left there for 16 hours with the outlet port of electrolyte and that of gas held closed. Then, the electrolysis process was resumed under the conditions same as before the stop of operation. Each of the specimens was observed for the same test items a week after the resumption of the operation. Table 5 also shows the results of observation under the heading of "1 week after reassembling and resumption of operation".

The specimens were observed for each of the test items in the following manner.

hydrogen overvoltage (V): A platinum wire having a diameter of 0.2 mm and covered by a tube made of polytetrafluoroethylene was partly exposed and arranged on the surface of the electrode for hydrogen generation so as to operate as reference electrode. The potential difference between the reference electrode and the electrode for hydrogen generation is expressed as hydrogen overvoltage.

corrected inter-electrode voltage (V): 32 mass % and 90° C. were selected respectively as reference values for the concentration of the aqueous solution of sodium hydroxide and the temperature of the electrolyzer and the inter-electrode voltage was corrected by means of the formula shown below, where concentration C (mass %) is the actual concentration and temperature T (° C.) is the actual temperature of the electrolyzer in the operation of each of the specimens.

corrected inter-electrode voltage $(V)$=inter-electrode voltage $(V)+0.009\times(T-90)+0.017\times(32-C)$.

average corrected inter-electrode voltage (V); the arithmetical average of corrected voltage (V).

sodium hydroxide generation reference current efficiency (%): the ratio of the quantity of electricity used for energization to the quantity of electricity determined on the basis of the generated quantity of sodium hydroxide.

Example 12

A specimen of electrode for hydrogen generation was prepared as in Example 1 except that the operation of applying and thermally decomposing the ruthenium nitrate-lanthanum acetate-dinitrodiammine platinum nitric acid solution was conducted for twelve cycles and the electrode catalyst coating layer was formed to a thickness of 11.5 μm. The specimen was evaluated for voltage drop as in Example 11. Table 4 shows the results of observation. FIG. 2 also shows the results of observation.

Further, table 5 shows the results of evaluation of the characteristic after exposure to the atmosphere.

5. Analysis of Electrode Catalyst Coating Layer

Figure 3:
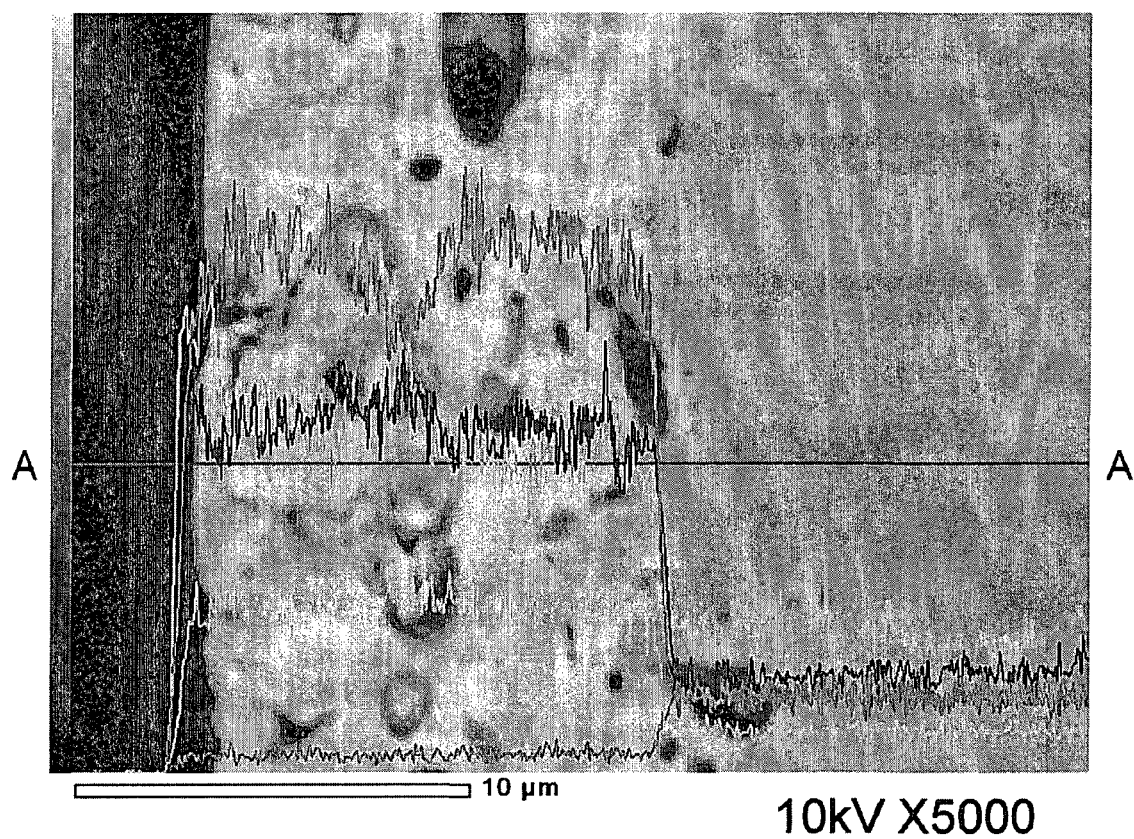
FIG. 3 is a photograph of the electrode catalyst coating layer of an electrode for hydrogen generation according to the present invention taken by way of a scanning electron microscope.

An image of a cross section of the electrode catalyst coating layer of the prepared electrode of Example 12 was picked up by a scanning electron microscope (JSM-6490, trade name, available from JEOL Ltd.) with an electric current of 50 kV and a magnification of 5,000 times. FIG. 3 shows the obtained image.

Figure 4:
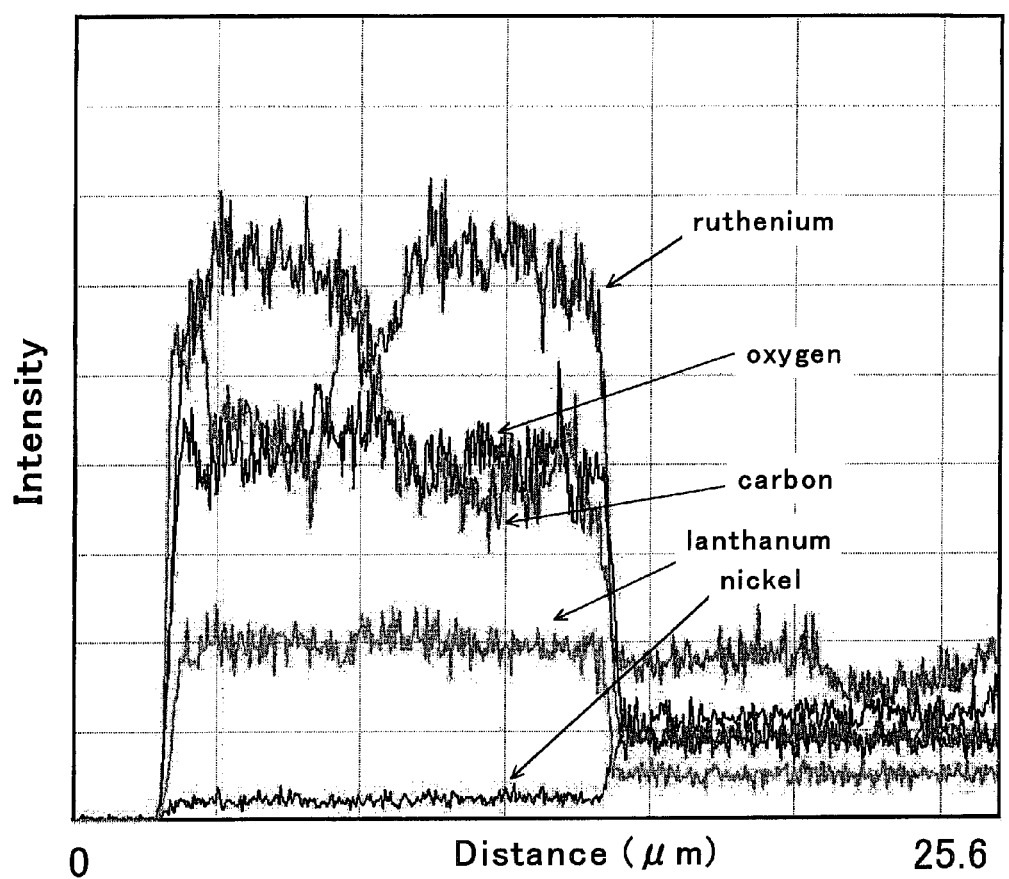
FIG. 4 is a graph illustrating some of the results of observation of a cross section of the electrode catalyst coating layer of an electrode for hydrogen generation according to the present invention in an elementary analysis, using an energy dispersive X-ray analyzer.

FIG. 4 shows the results obtained by an elementary analysis of the part indicated by line A-A in FIG. 3, using an energy dispersive X-ray analyzer (JED-2300, trade name, available from JEOL Ltd.). Note that the scale of intensity is arbitrarily selected for each of nickel, ruthenium, lanthanum, carbon and oxide simply in order to avoid overlaps of the graphs.

Example 13

A specimen of electrode for hydrogen generation was prepared as in Example 11 except that the nickel-made expanded metal was replaced by a nickel-made plain weave wire mesh using nickel wires having a diameter of 0.25 mm that were woven with square meshes of 1.27 mm for the conductive base member and the electrode catalyst coating layer was formed to a thickness of 4.2 μm and the cathode potential was observed by using the cathode potential evaluation process described in Example 1 to find that the cathode potential was −0.987 V.

Thereafter, the specimen was evaluated as in Example 11. More specifically, the voltage drop was observed at the intertwining points of the plain weave wire mesh of the conductive base member where the metal wires intersect each other. Table 4 shows the results of observation. FIG. 2 also shows the results of observation. Table 5 shows the results of evaluation of the characteristics after exposure to the atmosphere.

Example 14

A specimen of electrode for hydrogen generation was prepared as in Example 13 except that the electrode catalyst coating layer was formed to a thickness of 9.0 μm and the cathode potential was observed by using the cathode potential evaluation process described in Example 1 to find that the cathode potential was −0.987 V.

Thereafter, the specimen was evaluated as in Example 11. More specifically, the voltage drop was observed at the intertwining points of the plain weave wire mesh of the conductive base member where the metal wires intersect each other. Table 4 shows the results of observation. FIG. 2 also shows the results of observation.

TABLE 4

|  |  |  | Example 11 | Example 12 | Example 13 | Example 14 |
|---|---|---|---|---|---|---|
| type of conductive base member |  |  | EXP | EXP | plain weave | plain weave |
| thickness of electrode catalyst coating layer (μm) |  |  | 3.5 | 11.5 | 4.2 | 9.0 |
| voltage drop between points A and B (mV) | duration of electrolysis (hour) | 0 | 18.5 | 45.7 | 89.8 | 171.0 |
|  |  | 2 | 18.0 | 35.2 | 77.4 | 142.5 |
|  |  | 5.3 | 17.7 | 27.0 | 58.5 | 120.3 |
|  |  | 10.3 | 17.5 | 23.0 | 44.7 | 98.2 |
|  |  | 34 | 16.9 | 20.2 | 28.6 | 75.2 |
|  |  | 48 | 16.5 | 18.5 | 22.5 | 70.6 |
|  |  | 60 | 16.3 | 18.3 | 19.5 | 66.3 |
|  |  | 72 | 16.4 | 18.3 | 19.0 | 63.2 |

Table 5 shows the results of evaluation of the characteristics after exposure to the atmosphere.

TABLE 5

|  | immediately before the step of initial operation of electrolyzer | | | | 1 week after reassembling and resumption of operation | | | |
|---|---|---|---|---|---|---|---|---|
|  | Example 11 | Example 12 | Example 13 | Example 14 | Example 11 | Example 12 | Example 13 | Example 14 |
| type of conductive base member | EXP | EXP | plain weave | plain weave | EXP | EXP | plain weave | plain weave |
| thickness of electrode catalyst coating layer (μm) | 3.5 | 11.5 | 4.2 | 9.0 | 3.5 | 11.5 | 4.2 | 9.0 |
| Voltage drop between points A-B (V) | 0.016 | 0.018 | 0.019 | 0.039 | 0.017 | 0.018 | 0.018 | 0.031 |
| hydrogen overvoltage (V) | 0.077 | 0.071 | 0.074 | 0.074 | 0.076 | 0.073 | 0.075 | 0.074 |
| Average corrected inter-electrode voltage (V) | 2.818 | 2.818 | 2.818 | 2.818 | 2.816 | 2.816 | 2.816 | 2.816 |
| NaOH generation reference current efficiency (%) | 97.9 | 97.8 | 97.3 | 97.5 | 97.4 | 97.4 | 98.1 | 97.7 |

As seen from Table 5, no degradation of the characteristics of the electrode for hydrogen generation was observed even when the electrode was taken out from the electrolyzer after an operation and left in and exposed to the air before reusing it. It may be safe to assume that this means that the characteristics of the electrode catalyst coating layer are not degraded in the air and the metal of the conductive base member is neither oxidized nor affected otherwise because it is densely covered by the electrode catalyst coating layer.

Since an electrode for hydrogen generation according to the present invention is covered by an electrode catalyst coating layer that is formed on a conductive base member by applying a material not containing any chlorine atom and obtained by dissolving lanthanum carboxylate in a nitric acid solution of ruthenium nitrate and thermally decomposing the material in an oxygen-containing atmosphere, it shows a low hydrogen overvoltage and any degradation thereof due to oxidation of the electrode catalyst coating layer is suppressed after exposure to the air. Thus, it can be used for hydrogen generation reactions for a long period of time with a low electrolysis voltage.

What is claimed is:

1. An electrode for hydrogen generation comprising a coating layer on a conductive base member, said coating layer formed by thermally decomposing at temperature from 400° C. to 600° C. in an oxygen-containing atmosphere a material not containing any chlorine atom prepared by dissolving lanthanum carboxylate in a nitric acid solution of ruthenium nitrate.

2. The electrode for hydrogen generation according to claim 1, wherein the Ru/La atom ratio of the material of the applied solution is between 30/70 and 90/10.

3. The electrode for hydrogen generation according to claim 1, wherein the carboxylate is at least one selected from a group including lanthanum acetate, lanthanum formate and lanthanum oxalate.

4. The electrode for hydrogen generation according to claim 1, wherein the applied material contains at least a platinum compound not containing any chlorine atom and the Pt/La atom ratio therein is equal to or greater than 0.005.

5. The electrode for hydrogen generation according to claim 4, wherein the platinum compound is at least either dinitrodiammine platinum or hexahydroxo platinate.

6. An electrode for hydrogen generation having a coating layer containing atoms of ruthenium, lanthanum, oxygen and carbon, formed by thermally decomposing at temperature from 400° C. to 600° C. in an oxygen-containing atmosphere a material not containing any chlorine atom prepared by dissolving lanthanum carboxylate in a nitric acid solution of ruthenium nitrate and applied onto a conductive base member.

* * * * *